Nov. 21, 1950  J. D. BROWN  2,531,105
STEAK TREATING MACHINE
Filed July 7, 1947  2 Sheets-Sheet 1
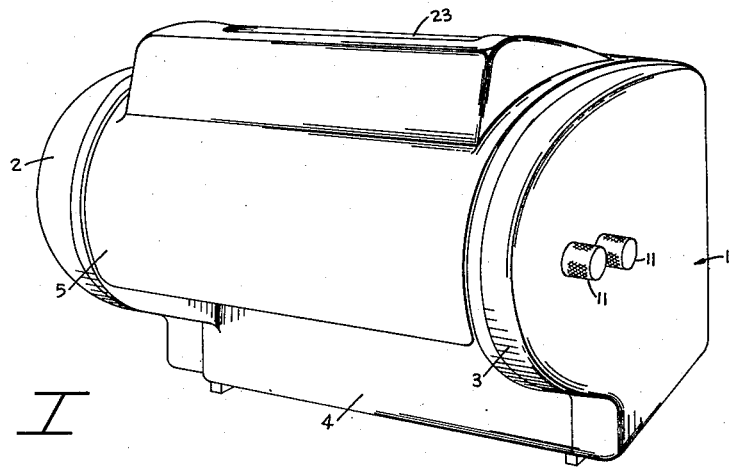
Fig. I
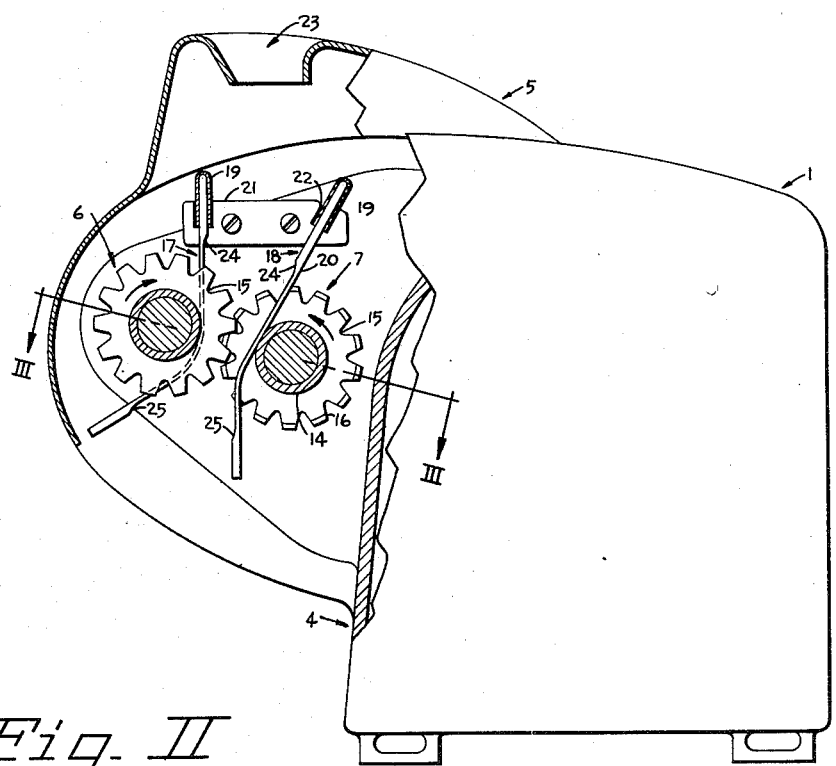
Fig. II
INVENTOR.
James D. Brown
BY
Marshall and Marshall
ATTORNEYS Nov. 21, 1950 J. D. BROWN 2,531,105
STEAK TREATING MACHINE
Filed July 7, 1947 2 Sheets-Sheet 2
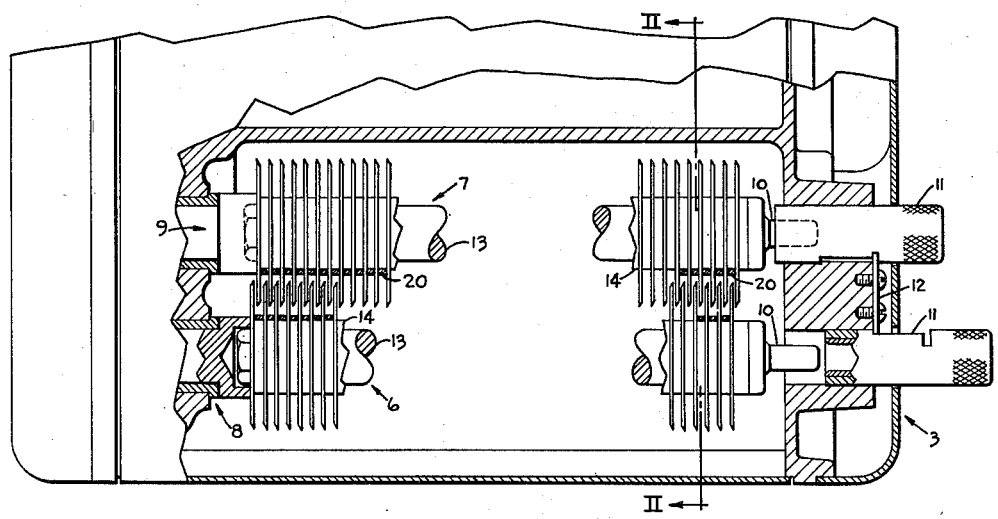
Fig. III
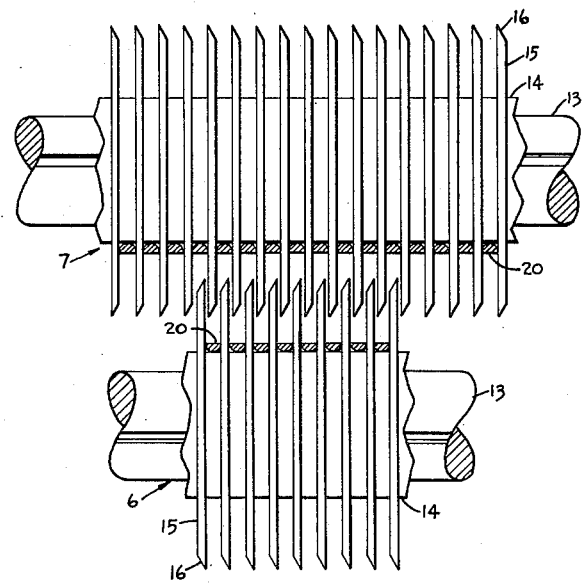
Fig. IV
INVENTOR.
James D. Brown
BY
Marshall and Marshall
ATTORNEYS Patented Nov. 21, 1950

2,531,105

UNITED STATES PATENT OFFICE 2,531,105

STEAK TREATING MACHINE

James D. Brown, Toledo, Ohio, assignor to Toledo Scale Company, Toledo, Ohio, a corporation of New Jersey Application July 7, 1947, Serial No. 759,357

3 Claims. (Cl. 17—26)

1

This invention relates to machines for treating steak of the type in which less tender pieces of meat are "tenderized" and made more palatable by being passed between a pair of processing rollers each of which is provided with numerous short sharp knives. In a machine of this type the steak is given a plurality of short cuts on each side which sever the sinews and tendons and thus render the meat less tough or stringy and open its surface so that when cooked it has the appearance and palatability of a much higher quality piece of steak.

Machines of this type usually are equipped with a pair of horizontally extending parallel knife rolls each of which has a plurality of disk-like toothed cutting knives. Therefore, machines of this type are equipped with meat guides which usually are constructed in the form of parallel guide wires extending between adjacent ones of the disk-like cutting knives. These guides serve two purposes. The first is to guide the meat into the space between the rollers and to guide it out of the machine and the second is to prevent the meat from wrapping around either or both of the knife rolls and from being carried around and around on the roll until it is squeezed down between the disk-like knives forming a mush which cannot be easily removed from the machine and which spoils the meat being treated.

The guide wires employed in machines of the prior art have been circular in cross section. Consequently, where they extend between adjacent ones of the disk-like cutting knives, since each wire must substantially fill the space between a pair of adjacent knives, there have been left small, substantially triangularly shaped spaces formed between the curved surfaces of the wires and the straight flat sides of the knives. These areas or spaces, being triangular in shape cause a wedging action which forces thin sinews and fibers of the meat between the wires and the adjacent knives.

It is an object of this invention to provide meat guides for a steak treating machine of the class described in which there is no wedging action between the sides of the knives and the guide wires.

It is another object of this invention to provide a meat guide for a steak treating machine having a treating roll comprising a plurality of disk-like toothed cutting knives mounted on an arbor which meat guide will prevent meat from wrapping around the knives or the arbor and also will obviate any tendency for the meat to wedge between the guide wires and the knives.

2

More specific objects and advantages will be apparent from the drawings in which:

Figure I is a view in perspective of a steak treating machine embodying the invention.

Figure II is an enlarged fragmentary view partly in elevation and partly in section of a steak treating machine embodying the invention.

Figure III is a fragmentary view in section taken approximately from the position indicated by the line III—III in Figure II.

Figure IV is a greatly enlarged view of fragments of the meat treating rolls of a steak treating machine embodying the invention.

The steak treating machine shown in Figure I comprises, in general, a housing 1 which is formed with a pair of forwardly extending arms 2 and 3, a drive housing 4 located at the rear of the machine and an apertured cover 5. The drive housing 4 contains a driving motor and gear mechanism (not shown) which is connected to rotate a pair of meat processing rollers 6 and 7. The meat processing rollers 6 and 7 are journaled in the space between the arms 2 and 3 of the housing 1, extending horizontally across such space with their left ends (Figure III) socketed in a pair of drive arbors 8 and 9 (Figure III). The right ends of the rollers 6 and 7 are journaled by tenons 10 in a pair of horizontally displaceable bearings 11 which extend through the outer wall of the housing arm 3. By disengaging the bearings 11 from a retaining plate 12 they can be slid horizontally to the right (Figure III) to disengage the tenons 10 permitting the rollers 6 and 7 to be shifted to the right to disengage their other ends from the socketed drive arbors 8 and 9 so the rollers can be removed from the machine when desired. The drive mechanism is so connected as to rotate the two rollers 6 and 7 inwardly toward each other as shown by the arrows in Figure II.

Each of the rollers 6 and 7 consists of a central shaft or arbor 13 upon which is mounted alternately a plurality of spacing collars 14 and disk-like toothed knives 15. Each of the knives 15 is formed of a thin disk of metal having sharp edged teeth 16 cut in its periphery. The two rollers 6 and 7 are located in the machine so that the peripheries of the knives 15 on the two rollers overlap in the area between the rollers the knives 15 being staggered on the two rollers to permit such overlapping.

The machine is equipped with a pair of meat guides 17 and 18 each of which consists of a crossbar 19 and a plurality of guide wires 20 mounted in the crossbar and extending therefrom at right angles to the crossbar and parallel to each other. There are provided in each guide 17 and 18 a sufficient number of wires 20 so that there is a wire 20 extending between each adjacent pair of knives 15 on the rollers 6 and 7. The guides 17 and 18 are mounted by means of their crossbars 19 in a pair of brackets 21 one of which is secured to the inner surface of each of the housing arms 2 and 3. The brackets 21 have notches 22 for the reception of the ends of the crossbars 19 so that, when desired, the guides 17 and 18 can be removed by lifting them substantially vertically, disengaging the ends of the crossbars 19 from the notches 22 and then pulling the guide wires 20 out from between the knives 15. The cover 5 of the machine is provided with an aperture 23 (Figure III) which is located immediately above the upper diverging ends of the guides 17 and 18 and through which aperture a piece of steak to be treated can be inserted into the machine.

Each of the guide wires 20 is milled flat, from a point designated by the numeral 24 in Figure II above the place where the guide enters between a pair of the knives 15 when it is positioned in the machine, along its length to a point designated by the numeral 25 in Figure II which is below the periphery of the knives and thus beyond the lowermost point of engagement between the guide wire and its adjacent knives. The wire is milled to a semicylindrical shape in cross section as can best be seen in Figure IV. The flat, inwardly directed surface of each of the guide wires 20 furnishes a surface over which the meat glides and the lateral edges of the guide wires extend substantially perpendicular to the flat sides of the adjacent knives 15. This eliminates the triangular spaces which exist in machines equipped with circular guide wires and into which spaces meat is wedged by the action of the rotating knives tending to pull the meat around with the knives. Because the guide wires are circular on their outer surfaces, when the knives, rotating as shown by the arrows in Figure II, reach the position where they first pass between the guide wires, the guide wires tend to straighten up the knives if they have been bent or slightly deflected by engagement with bits of bone or other obstruction in the meat being treated. The scraping engagement between the sharp corners at the edges of the flat portions of the guides maintains the sides of the knives in a much cleaner condition than when the guide wires are circular in cross section and their peripheries merely rub on the sides of the knives.

The milled guides constituting the principal portion of the instant invention thus eliminate the tendency for meat to wedge between guide wires and adjacent disk-like knives and clean the knives of such small bits of meat and sinew as may lodge thereon during the actual operation of the machine, thus greatly simplifying the job of cleaning the machine after use and facilitating the maintenance of the machine in sanitary condition.

The embodiment of the invention which has been disclosed may be modified to meet various requirements.

Having described my invention, I claim:

1. In a steak treating machine, in combination, a treating roll comprising a plurality of spaced disk-like toothed cutting knives and a meat guide having a plurality of parallel guide wires extending one between each adjacent pair of said knives, said guide wires being semicircular in cross section where passing between adjacent knives, the flat sides of said guide wires being turned outwardly away from the centers of said knives.

2. A meat guide for a steak treating machine having a meat treating roller comprising a plurality of spaced disk-like toothed cutting knives, comprising, a crossbar and a plurality of parallel guide wires mounted on said crossbar and extending between the knives on said roll, the diameters of said guide wires being such as to cause slight frictional engagement between the sides of each of said wires and the sides of the knives between which it extends, said guide wires being semicircular in cross section where extending between said knives and the flat side of said wires being turned outwardly away from the centers of said knives.

3. In a machine for treating steaks, in combination, a pair of parallel overlapping treating rolls, each roll comprising a plurality of spaced, disk-like toothed edge cutting knives, drive means for rotating said rolls toward each other with the knives thereon moving downwardly where overlapping, and a pair of meat guides, one for each of said rolls, said meat guides each comprising a crossbar and a plurality of parallel guide wires mounted on said crossbar and extending between the knives on said roll, the diameters of said guide wires being such as to cause slight frictional engagement between the sides of each of said wires and the sides of the knives between which it extends, said guide wires being semicircular in cross section where extending between said knives and the flat side of said wires being turned outwardly away from the centers of said knives.

JAMES D. BROWN.

REFERENCES CITED

The following references are of record in the file of this patent:

UNITED STATES PATENTS

| Number | Name | Date |
| --- | --- | --- |
| 1,973,284 | Huse | Sept. 11, 1934 |
| 2,364,533 | Jackson | Dec. 5, 1944 |
| 2,409,463 | Ahrndt | Oct. 15, 1946 |
| 2,450,688 | Richard | Oct. 5, 1948 |